United States Patent [19]

Matsuura

[11] Patent Number: 5,266,811
[45] Date of Patent: Nov. 30, 1993

[54] DIGITIZING CONTROL EQUIPMENT UTILIZING NORMAL VECTOR CALCULATIONS AND A POSITION SENSOR

[75] Inventor: Hitoshi Matsuura, Hachioji, Japan

[73] Assignee: Fanuc Ltd., Minamitsuru, Japan

[21] Appl. No.: 877,184

[22] PCT Filed: Nov. 8, 1991

[86] PCT No.: PCT/JP91/01535

§ 371 Date: Jul. 1, 1992

§ 102(e) Date: Jul. 1, 1992

[87] PCT Pub. No.: WO92/08575

PCT Pub. Date: May 29, 1992

[30] Foreign Application Priority Data

Nov. 8, 1990 [JP] Japan .................. 2-303103

[51] Int. Cl.⁵ ............................................. G01N 21/86
[52] U.S. Cl. ......................................... 250/560; 356/376
[58] Field of Search ................ 250/560, 561; 356/376

[56] References Cited

U.S. PATENT DOCUMENTS

| | | | |
|---|---|---|---|
| 4,827,436 | 5/1989 | Sabersky et al. | 250/561 |
| 4,843,287 | 6/1989 | Taft | 356/376 |
| 4,988,202 | 1/1991 | Nayer et al. | 356/376 |
| 5,046,852 | 9/1991 | Hametner et al. | 356/376 |

FOREIGN PATENT DOCUMENTS

| | | |
|---|---|---|
| 61-89505 | 5/1986 | Japan . |
| 1-188255 | 7/1989 | Japan . |
| 3-3760 | 1/1991 | Japan . |
| 3-60956 | 3/1991 | Japan . |
| 3-60957 | 3/1991 | Japan . |
| 3-167411 | 7/1991 | Japan . |

Primary Examiner—David C. Nelms
Assistant Examiner—T. Davenport
Attorney, Agent, or Firm—Staas & Halsey

[57] ABSTRACT

A digitizing control device which is inexpensive and capable of generating a normal vector representing the direction of a normal line to a model surface on a real-time basis by a light-section method, wherein a table (31), on which a model (6) is placed, is horizontally moved relative to a tracer head (4) to which a light source (5a) and a camera (5b) are mounted, and a processor (11) of a control device (1) periodically samples measurement data representing two detection points, at which a received-light pattern on the camera crosses two one-dimensional optical sensors arranged at a light-receiving face of the camera, and table/camera movement control data, generates tracing data in accordance with the coordinates of two points on the model surface obtained from the sampled data, calculates a normal vector of the model surface on the basis of the coordinates of the two points and the coordinates of a point on the model surface obtained at a previous sampling time, and positions the tracer head at a rotational position corresponding to the normal vector so that the slit light accurately fall upon the camera.

5 Claims, 4 Drawing Sheets

DIGITIZING CONTROL EQUIPMENT UTILIZING NORMAL VECTOR CALCULATIONS AND A POSITION SENSOR

DESCRIPTION

1. Technical Field

This invention relates to a digitizing control equipment for generating tracing data representing a model shape, more particularly to a digitizing control device capable of determining a normal vector representing a normal direction of a curved surface of a model on a real-time basis during a non-contact tracing of the curved surface of the model.

2. Background Art

Regarding digitizing control equipment for generating tracing data, it is known to detect a distance to a model surface in a non-contact manner while tracing the model surface by moving an optical distance detector along the model surface. This type of devices are advantageous in that the model surface is not damaged while being traced, unlike devices in which a model is traced by a stylus or the like.

Among conventional optical distance detectors, widely used is a spot type detector in which a spot light is irradiated onto a model surface for distance detection. The spot type detector, however, can provide only one-dimensional information if the detector has only a pair of light-projecting and light-receiving sections. Thus, in digitizing control devices equipped with spot type detectors, spot lights are irradiated onto the model surface from a plurality of light-projecting sections and tracing data is computed based on measurement data obtained through a plurality of light-receiving sections (Japanese Patent Application No. 1-194500). Thus, the spot type digitizing control device requires a plurality of pairs of light-projecting and light-receiving sections and must process a great deal of data, and therefore, is costly.

Also known is a light-section type vision system, in which a light pattern formed on the model surface when a slit light is irradiated thereon is photographed by a camera and a light-pattern image is analyzed to thereby recognize the model shape (Japanese Patent Application No. 2-243148). This light-section method may be applicable to the digitizing control equipment. In this case, however, the digitizing control equipment must be designed so that a normal vector representing the normal direction of a model surface be generated on a real-time basis to permit a continuous tracing operation of a machine in accordance with the tracing data. At the same time, to recognize a model shape by the light-section method, it is essential to process a great deal of image data from a large number of two-dimensionally arranged light-receiving elements forming the light-receiving section such as a CCD. Thus, image data must be processed at high speeds to meet the above requirements and thereby enable a tracing operation. Generally, however, it is difficult to process a great deal of image data at high speeds. Therefore, if the light-section method, which is well known in the field of the aforementioned vision system, is merely applied to the digitizing control equipment, a reduction of the tracing accuracy, for example, is unavoidable.

DISCLOSURE OF THE INVENTION

An object of this invention is to provide an inexpensive digitizing control equipment which can generate a normal vector representing the normal direction of a model surface on a real-time basis by a light-section method.

To achieve the above object, this invention provides a digitizing control equipment for generating tracing data representing a model shape while carrying out a non-contact tracing of a model surface. The digitizing control equipment comprises: a light-projecting section for projecting a slit light onto the model surface; a light-receiving section for receiving the slit light reflected from the model surface; movement control means for moving the light-projecting section and the light-receiving section along the model surface relative to the model in accordance with movement control data; a position sensor for simultaneously measuring two-dimensional positions of at least two points on the model surface in accordance with a received-light pattern obtained at the light-receiving section, and generating measurement data representing the two-dimensional positions of the two points; and vector calculating means for calculating a normal vector of a slit-light-irradiated portion of the model surface in accordance with the movement control data and the measurement data.

As described above, according to this invention, two-dimensional positions of at least two points on the model surface are simultaneously measured by the position sensor on the basis of the pattern of the received slit light, and a normal vector at the slit light-irradiated portion of the model surface is calculated on the basis of the measurement data from the position sensor representing the two-dimensional positions of the two points and the control data related to the movement of the light-projecting and light-receiving sections. Since the normal vector of the model surface is calculated on the basis of a small amount of data including the measurement data representing the two-dimensional positions of the two points and the control data related to the movement of the light-projecting and light-receiving sections, a real-time calculation of the normal vector can be carried out during a movement of the light-projecting and light-receiving sections relative to the model, and thus during a tracing operation of a machine in accordance with the tracing data supplied from the digitizing control device. Accordingly, it is sufficient for a position sensor to be capable of measuring two-dimensional positions of two points on the model surface from the received-light pattern, and therefore, the construction of the sensor can be simplified and the measuring accuracy thereof can be easily improved. More particularly, the digitizing control device according to this invention can efficiently generate tracing data at a low cost by a light-section method using a slit light.

BEST MODE OF CARRYING OUT THE INVENTION

Figure 1:
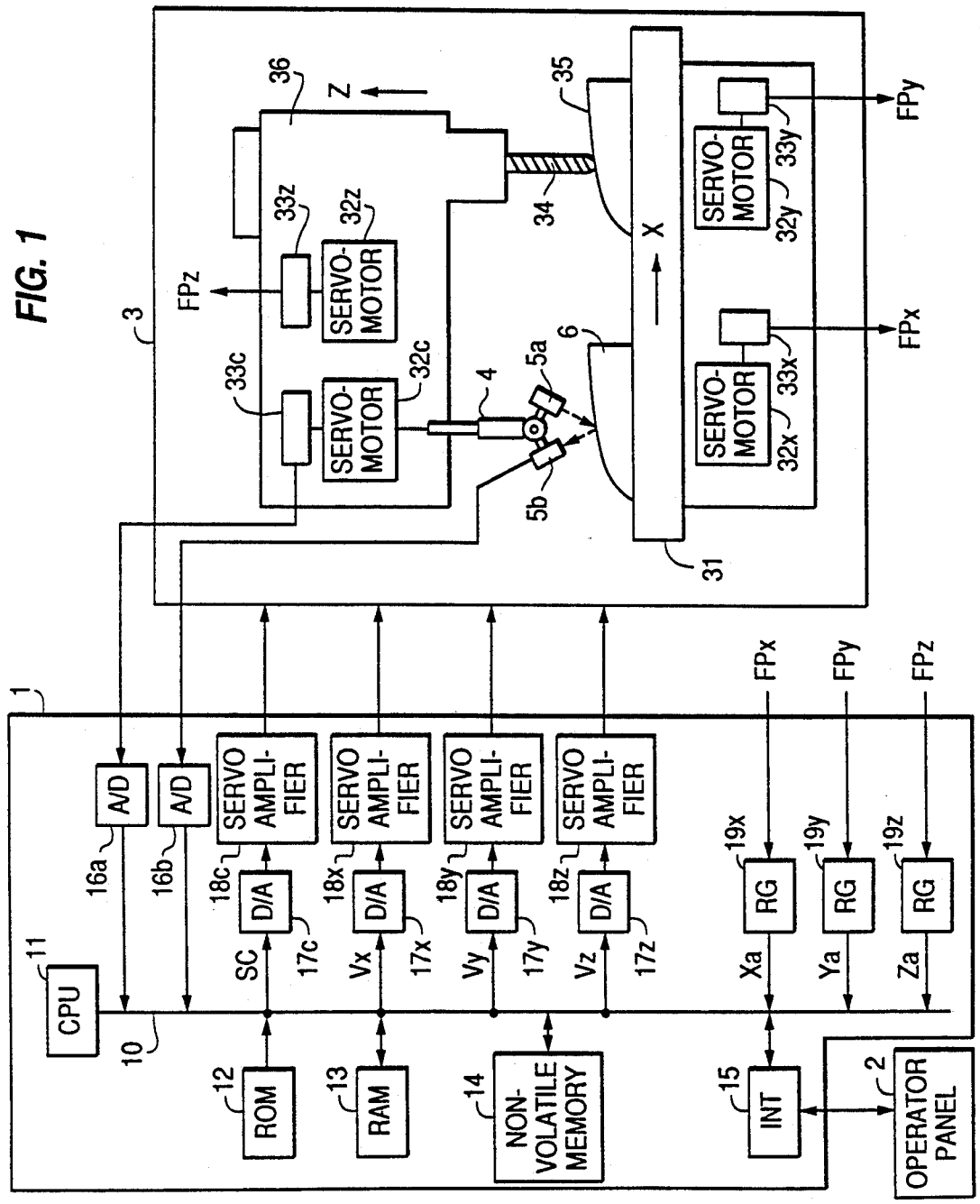
FIG. 1 is a schematic diagram illustrating a digitizing control device according to an embodiment of this invention, together with a tracing machine tool.

Referring to FIG. 1, a tracing machine tool 3 comprises a table 31 horizontally movable in an X-axis direction and a Y-axis direction perpendicular to the paper surface, and a Z-axis unit 36 vertically movable in a Z-axis direction relative to the table 31. A model 6 and a workpiece 35 are placed on the table 31. A tool 34 is attached to the Z-axis unit 36, and a light source 5a and a detector 5b, which respectively serve as a light-projecting section and a light-receiving section of a digitizing control equipment 1, are mounted on a tracer head 4. Pulse coders 33x, 33y and 33z are mounted on table drive servomotors 32x and 32y, and a servomotor 32z for driving the Z-axis unit respectively. Symbol 32c represents a servomotor for rotating the tracer head 4 around a perpendicular rotary axis (C axis shown in FIG. 2), and a pulse coder 33c is mounted on the servomotor 32c.

Figure 2:
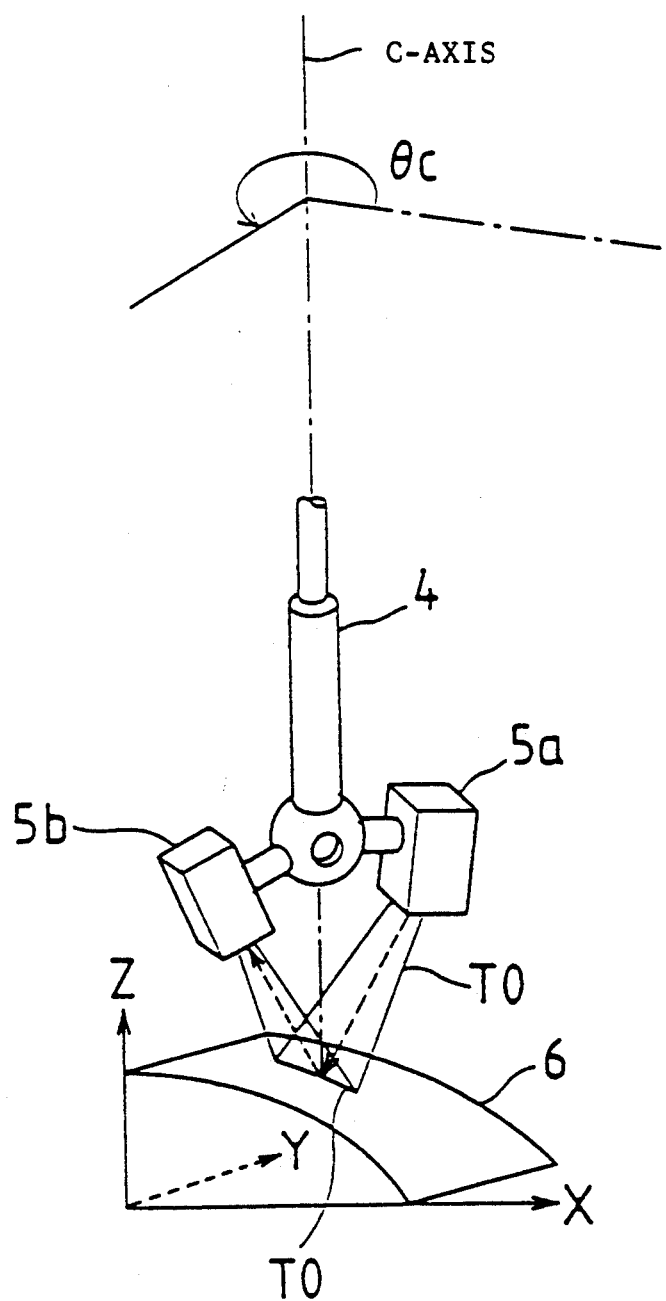
FIG. 2 is an enlarged perspective view showing details of a tracer head, a light source and a camera in FIG. 1.

The light source 5a, comprising, for example, a semiconductor laser or light-emitting diode, is obliquely mounted on the tracer head 4, as shown in FIG. 2, in such a manner that an optical axis thereof obliquely extends at a predetermined angle with respect to the rotary axis (C axis) of the tracer head, which extends parallel to the Z axis, to irradiate a part of surface of the model 6, which includes an intersection of the model surface and the C axis with a slit light T0 projected at the predetermined angle thereto.

Figure 3:
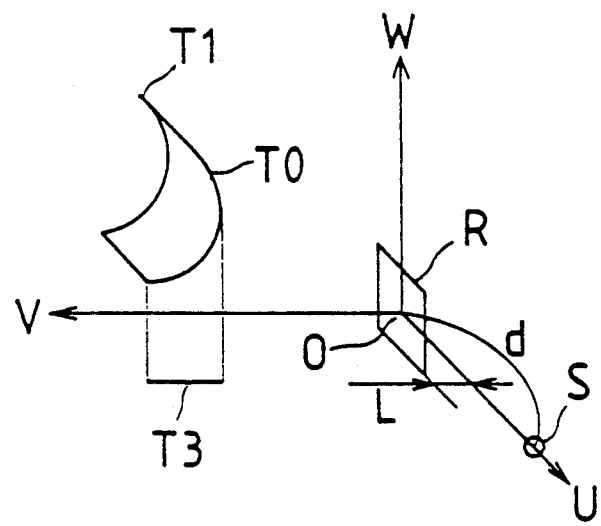
FIG. 3 is a diagram showing the relationship between a U-V-W space coordinate system established with respect to the camera and a slit light.
Figure 4:
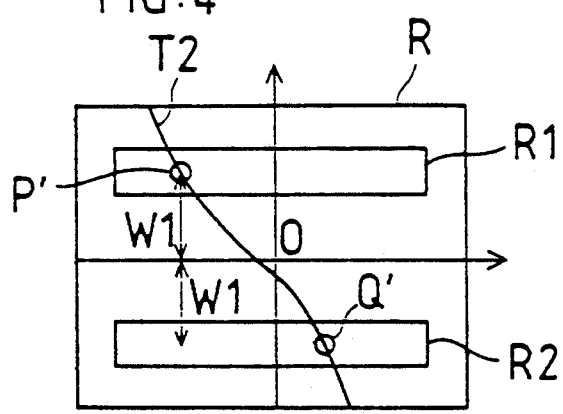
FIG. 4 is an enlarged plan view showing a light-receiving face of the camera and a position sensor arranged at the light-receiving face.

The detector 5b is arranged apart from the light source 5a and on the opposite side of the tracer head 4, and receives the slit light T0 reflected at the model surface (FIG. 2). As shown in FIG. 3, the detector 5b has a lens (not shown), having a focal distance of L and arranged at the origin O of a space coordinate system U-V-W established with respect thereto and a light-receiving face R arranged at the focal point of the lens and parallel to the U-W plane. The optical axis of the lens extends passing through the center of the light-receiving face R. First and second one-dimensional optical sensors R1 and R2, which serve as position sensors, are arranged at the light-receiving face R being spaced from each other by a distance of 2 W1 (FIG. 4). The rotational position of the tracer head 4 is controlled in accordance with the model shape, thereby reducing the positional error of irradiation of the slit light resulting from an allowable follow-up error of the tracer head 4 in the Z-axis direction to make the slit light T0 reflected from the model surface accurately come into the detector 5b, as described in detail later. Thus, a pattern T2 of the slit light T0 formed on the detector 5b always falls upon the light-receiving face R across both the optical sensors R1 and R2, regardless of the model shape (FIG. 4). More particularly, the points of intersection of the received-light pattern T2 with the optical sensors R1 and R2 are detected as detection points P' and Q' to simultaneously measure the two-dimensional positions of two point P and Q on the model surface corresponding to the detection points P' and Q'.

Figure 5:
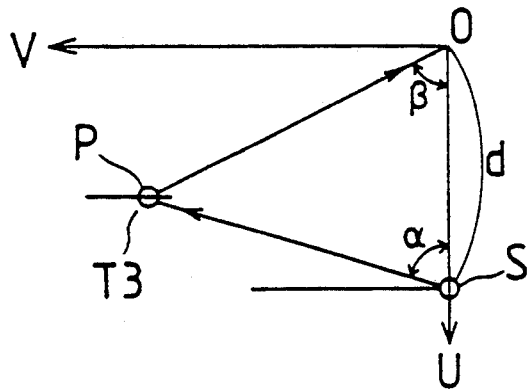
FIG. 5 is a diagram showing a propagation path of the slit light in a U-V plane.
Figure 6:
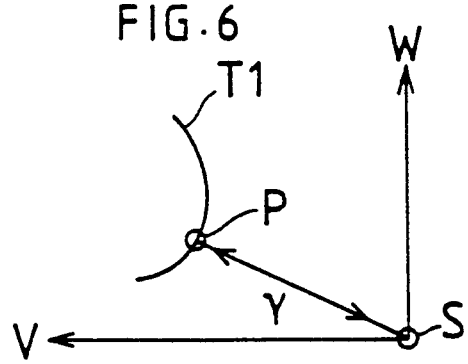
FIG. 6 is a diagram showing a propagation path of the slit light in a V-W plane.

In FIG. 3, symbols T1 and T3 represent projections of the slit light T0 onto the V-W plane and U-W plane respectively (The same as the cases shown in FIGS. 5 and 6). Symbol S represents the center of the light source 5a, which is spaced from the coordinate origin O by a distance of d along the U axis.

The digitizing control equipment 1, designed for generating tracing data in accordance with the measurement data from the detector 5b and the outputs of the various pulse coders or for controlling the operation of the tracing machine tool 3, comprises a processor 11, a read-only memory (ROM) 12 storing a system program for controlling the entire operation of the digitizing control equipment, a random-access memory (RAM) 13 for temporarily storing data including the measurement data, etc., and a nonvolatile memory 14 backed up by a battery, (not shown) and storing various parameters such as a commanded tracing direction, commanded tracing speed, etc., which is inputted through an operator panel 2.

The digitizing control equipment 1 further comprises an interface connected to the operator panel 2, A/D converters 16a and 16b with their input terminals respectively connected to the pulse coder 33c and the first and second optical sensors R1 and R2; D/A converters 17c, 17x, 17y and 17z; servo amplifiers 18c, 18x, 18y and 18z with their input terminals respectively connected to the D/A converters and their output terminals connected to the servomotors 32c, 32x, 32y and 32z; and current position registers (RG) 19x, 19y and 19z with their input terminals respectively connected to the pulse coders 33x, 33y and 33z. The processor 11 is connected to the elements 12 through 17z and 19x through 19z via a bus 10.

The operation of the digitizing control equipment 1 and tracing machine tool 3 will be described.

Before starting the machine tool 3, the operator manually inputs various parameters such as a command tracing direction and a command tracing speed through the operator panel 2, whereupon the input parameters are stored in the nonvolatile memory 14 under the control of the processor 11.

During an operation of the machine tool 3, the processor 11 reads out, as control data, rotational position data from the pulse coder 33c and measurement data representing the shape of the model 6 from the detector 5b through the A/D converters 16a and 16b. Further, the processor 11 calculates amounts of displacement of the individual axes on the basis of the control data and values stored in the current position registers 19x, 19y and 19z, and generates speed commands Vx, Vy and Vz for the respective axes in accordance with the amounts of the axis displacements, the commanded tracing direction, and the commanded tracing speed. The speed commands Vx, Vy and Vz are converted into analog values by the D/A converters 17x, 17y and 17z, and then supplied to the servo amplifiers 18x, 18y and 18z.

The servo amplifiers 18x, 18y and 18z drive the servomotors 32x, 32y and 32z in accordance with the speed commands, whereby the table 31 is moved in the X-and Y-axis directions, and the tracer head 4 and the tool 34 are moved in the Z-axis direction. As the table 31 is moved, the slit light moves relative to the surface of the model 6. The pulse coders 33x, 33y and 33z generate detection pulses FPx, FPy and FPz each time the rotation of the corresponding servomotors 32x, 32z and 32y exceeds a predetermined angle, and current position data Xa, Ya and Za of the X, Y and Z axes stored in the current position registers 19x, 19y and 19z are incremented or decremented upon generation of the corresponding detection pulses, depending upon the direction of rotation.

While the above operation is carried out, the processor 11 obtains space coordinates (U, V, W) of a point in the slit light-irradiated portion of the model surface with reference to the detector coordinate system, in accordance with the measurement data periodically sampled through the detector 5b and the current position data Xa, Ya and Za used as control data related to the movement of the light-receiving and light-projecting sections, converts such coordinate values into space coordinates (X, Y, Z) with reference to a model coordinate system, and obtains a normal vector of the model surface. The space coordinates (U, V, W) are represented by the following equations (1) to (3) based on the principle of trigonometry:

$$V = d \cdot \tan \alpha \cdot \tan \beta / (\tan \alpha + \tan \beta) \quad (1)$$

$$U = d \cdot \tan \alpha / (\tan \alpha + \tan \beta) \quad (2)$$

$$W = V \cdot \tan \gamma \quad (3)$$

where $\alpha$ represents the angle between the slit light emitted from the light source 5a and the U axis; $\beta$ represents the angle between the reflected slit light from the model 6 and the U axis; and $\gamma$ represents the angle between the slit light from the light source and the V axis. The angle $\alpha$ is determined depending on the mounting position and orientation of the light source 5a with respect to the tracer head 4 and thus is known, and the distance d between the light source 5a and the detector 5b is also known.

Figure 7:
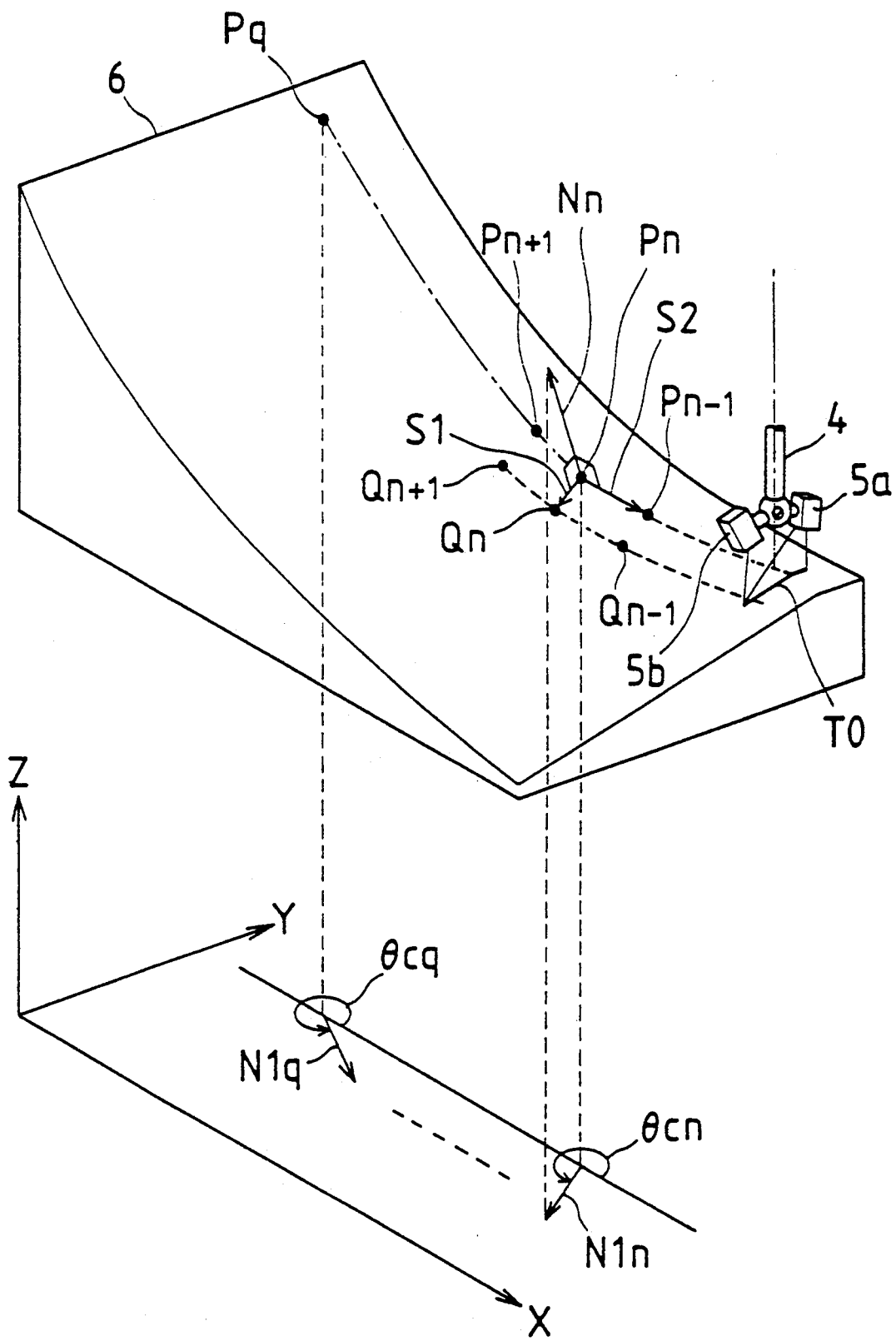
FIG. 7 is a perspective view showing the tracer head, light source, camera, and part of a model in connection with a normal vector determination procedure.

More specifically, while the tracer head 4 is moving in the X-axis direction at the commanded tracing speed relative to the model 6, as shown in FIG. 7, the processor 11 samples the data measured by the detector 5b and the current position data Xa, Ya and Za at predetermined time intervals. To obtain coordinates (Upn, Vpn, Wpn) of a point Pn (n=1, 2, ...), which is on the model surface and sampled at the present sampling time, with reference to the detector coordinate system U-V-W, the processor 11 obtains a W-axis coordinate Wpn of the point P on the basis of the current position data Za, etc. Then, based on the angle $\beta$ which corresponds to the angle of incidence to the detector 5b and calculated from the position of the detection point P'n on the optical sensor R1, and the known angle $\alpha$ and the distance d, U- and V-axis coordinates Upn and Vpn are calculated. Similarly, coordinates (Uqn, Vqn, Wqn) of a point Qn on the model surface are calculated. Further, the processor 11 transforms the coordinates (Upn, Vpn, Wpn) of the point Pn with reference to the detector coordinate system into coordinates (Xpn, Ypn, Zpn) with reference to the model coordinate system, and similarly transforms the coordinates (Uqn, Vqn, Wqn) of the point Qn into coordinates (Xqn, Yqn, Zqn). Accordingly, tracing data representing the shape of the model 6 is generated.

To control the rotational position of the tracer head 4 for improving the accuracy of the tracing data, the processor 11 further obtains a first surface vector S1n [Xqn−Xpn, Yqn−Ypn, Zqn−Zpn] on the basis of, e.g., the coordinates (Xpn, Ypn, Zpn) of the point Pn and the coordinates (Xqn, Yqn, Zqn) of the point Qn, and a second surface vector S2n [Xpn−1−Xpn, Ypn−1−Ypn, Zpn−1−Zpn] on the basis of the coordinates (Xpn, Ypn, Zpn) of the point Pn and coordinates (Xpn−1, Ypn−1, Zpn−1) of a point Pn−1 stored in the RAM 13 at the previous sampling time. Further, the processor 11 obtains the outer product S1n × S2n of the vectors S1n and S2n as a normal vector Nn at the point Pn, and calculates an angle $\theta cn$ ($= \tan^{-1}(Jn/In)$) between a projection vector N1n of the normal vector Nn onto the X-Y plane and the X axis. Symbols In and Jn represent the X-axis component and Y-axis component of the vector Nn respectively.

Then, the processor 11 generates a spin command SC corresponding to the direction of the projected vector N1n. The spin command SC is converted into an analog value by the D/A converter 17c, and then supplied to the servo amplifier 18c. The servo amplifier 18c drives the servomotor 32c in accordance with the rotation command SC, whereby the tracer head 4 is rotated around the C axis and positioned at the commanded angular position $\theta cn$. As a result, the optical axes of the light source 5a and detector 5b are adjusted in accordance with the model shape so that the slit light T0 accurately falls upon the camera 5b, whereby the accuracy of calculation of the normal vector Nn can be improved.

While the table 31 is horizontally moving in the X-Y plane in the command tracing direction at the commanded tracing speed by the operation of the servomotors 32x, 32y and 32z as described above, the position of the Z-axis unit 36 along the Z-axis direction is controlled in accordance with the Z-axis coordinates Zpn and Zqn of the points Pn and Qn on the model surface calculated by the processor 11 so that the distance between the tracer head 4 and the model surface becomes constant, and the workpiece 35 on the table 31 is machined to the same shape as the model 6 by the tool 34 mounted to the Z-axis unit 36.

This invention is not limited to the above-described embodiment, and various modifications can be made.

For example, in the above embodiment, the normal vector is made to be calculated based on data related to a point on the model surface measured at the previous sampling time and data related to two points measured at the present sampling time, but it may be computed from the measurement data related to arbitrary three points among four points measured at the previous and present sampling times. Alternatively, two-dimensional positions of three points on the model surface may simultaneously be measured based on a received-light pattern obtained by projecting two slit lights crossing at a right angle to each other onto the model surface, so that the normal vector can be computed from two surface vectors obtained from the three measurement points.

Further, the embodiment uses an active type position detector with a built-in light source fixed to the tracer head 4 together with the detector so that the light source can move together with the detector, but a passive type position detector having a light source movable independent of the tracer head may alternatively be used.

The foregoing embodiment is described with reference to a digitizing control equipment having not only a function of generating tracing data but also a function of tracing a model; however, this invention can be applied to a digitizing control equipment not having a tracing function but having only a function of automatically outputting the tracing data to an NC tape or the like.

I claim:

1. A digitizing control device for generating tracing data representing a model shape while carrying out a non-contact tracing of a model surface, comprising:
   a light-projecting section for projecting a slit light onto the model surface;
   a light-receiving section for receiving the slit light reflected from the model surface;
   movement control means for moving the light-projecting section and the light-receiving section along the model surface relative to the model in accordance with movement control data;
   a position sensor for simultaneously measuring two-dimensional positions of at least two points on the model surface in accordance with a received-light pattern obtained at the light-receiving section, and generating measurement data representing the two-dimensional positions of said at least two points; and vector calculating means for calculating a normal vector of a slit-light-irradiated portion of the model surface in accordance with the movement control data and the measurement data.

2. The digitizing control equipment according to claim 1, which further comprises a tracer head, to which the light-projecting section and the light-receiving section are fixed, the movement control means moving the tracer head along the model surface with the tracer head being spaced from the model surface.

3. The digitizing control equipment according to claim 1, which further comprises two one-dimensional optical sensors arranged on a light-receiving face of the light-receiving section extending parallel to each other, and rotation control means for positioning the two optical sensors at a rotational position such that the received-light pattern crosses both the optical sensors.

4. The digitizing control equipment according to claim 1, wherein said vector calculating means includes memory means for storing measurement data representing a two-dimensional position of at least one point on the model surface to which the slit light was already irradiated, and calculating means for specifying three points on the model surface in accordance with the measurement data read from the memory means, the data generated by the position sensor and representing the two-dimensional positions of said at least two points on the model surface and the movement control data, as well as for calculating an outer product of two surface vectors both having a start point at one of the three points, as the normal vector.

5. The digitizing control equipment according to claim 1, wherein the position sensor simultaneously measures two-dimensional positions of at least three points on the model surface in accordance with a received-light pattern of two slit lights.

* * * * *